US007147266B2

(12) United States Patent
Huntsman et al.

(10) Patent No.: US 7,147,266 B2
(45) Date of Patent: Dec. 12, 2006

(54) HINGED ASSEMBLY LOCKING SYSTEM

(76) Inventors: Laren K. Huntsman, 140 S. Center St., P.O. Box 863, Castle Dale, UT (US) 84513; Thomas S. Martin, 1125 Beechwood St., Camarillo, CA (US) 93010

( * ) Notice: Subject to any disclaimer, the term of this patent is extended or adjusted under 35 U.S.C. 154(b) by 138 days.

(21) Appl. No.: 10/854,346

(22) Filed: May 26, 2004

(65) Prior Publication Data

US 2005/0285409 A1 Dec. 29, 2005

(51) Int. Cl.
*B60J 5/10* (2006.01)

(52) U.S. Cl. .................................................... 296/146.1

(58) Field of Classification Search ............. 296/146.1, 296/76, 50, 56

See application file for complete search history.

(56) References Cited

U.S. PATENT DOCUMENTS 2,703,430 A 3/1955 Thomas et al.
5,235,725 A 8/1993 Rees
5,243,738 A 9/1993 Kiefer
5,263,546 A 11/1993 Cady et al.
5,385,212 A 1/1995 Cady et al.
5,437,348 A 8/1995 Cady et al.
6,513,617 B1 2/2003 Sasaki et al.
6,568,033 B1 5/2003 Kim
6,926,363 B1 * 8/2005 Yamashita .................. 297/366
7,059,653 B1 * 6/2006 Oberheide ............... 296/146.1
2001/0005920 A1 7/2001 Kim
2002/0014367 A1 2/2002 Sasaki et al.

* cited by examiner

*Primary Examiner*—H Gutman
(74) *Attorney, Agent, or Firm*—Thorpe North & Western LLP

(57) ABSTRACT

A hinge locking system comprising: (a) a first component; (b) a second component relating to the first component; (c) at least one hinge system pivotally coupling the first and second components together, such that at least one of the first and second components is rotatable between a starting and ending or an open and closed position; and (d) means for locking the hinge system, wherein the means may be selectively actuated to support the first and second components in one of a plurality of desired positions relative to one another and anywhere within their range of motion. In an exemplary embodiment, means for locking comprises a ratchet system, such as a ratchet clutch that provides one or two-way locking of the hinge system.

27 Claims, 6 Drawing Sheets

HINGED ASSEMBLY LOCKING SYSTEM

FIELD OF THE INVENTION

The present invention relates to hinges and hinged assemblies, and particularly to a method and apparatus for locking a hinged assembly, and particularly a hinged component, in a desired position, such as a fully open position or an interim position. Specifically, the present invention relates to a vehicle hinged closure locking system and method for locking one or more closures of a vehicle (e.g., trunk, hood, door) in one of several desired positions.

BACKGROUND OF THE INVENTION AND RELATED ART

Several types of hinged assemblies exist in the art, each comprising different features or mechanisms depending upon the particular use for which the hinged assembly is intended. Hinged assemblies have proven to be a very workable solution and have provided a simple, efficient method of allowing two or more components to move about one another in a designated manner. Because of their simple design and efficient performance, hinged assemblies can be found in many everyday products, building structures, vehicles, and even complex systems.

Perhaps the most common or well-known type of hinged assembly comprises a movable member, such as a door or a lid, coupled to a stationary base or receiver capable of receiving the movable member and allowing the movable member to come to rest within the base or receiver. The one or more hinges coupling these two components together is designed to allow the movable member to transition or rotate about the hinged axis uninterruptedly between an open or first position to a closed or final position without providing any ability for the movable member to be supported in an interim position. Another similar type of hinged assembly exists, but comprises two movable members that are designed to move relative to one another about the hinged axis.

While most of the time it is unnecessary to require a hinged assembly to stop in an unintended interim position, or even in a fully opened position, there are instances where this is desirable. One particular instance is when a large cargo load is required to be carried in the back or trunk of a vehicle and the cargo load is large enough so that the trunk lid or back door of the vehicle is prohibited from closing. In this instance, because of the built-in tendency of the trunk lid or door to swing to an open position (usually assisted by one or more hydraulic devices) the trunk lid or door will not stay in one or more interim positions, but instead swings to the fully opened position. With the trunk lid or door in this fully opened position, the vehicle is difficult to drive, and in many cases may be subject to penalties or fines imposed by law. In addition, the cargo load is unprotected and is subject to environmental elements as well as those conditions induced by driving, such as splashing water, loose asphalt, road tar, flying rocks, and other debris. Moreover, even if the cargo load is not so big as to immediately force the trunk or door in an open position, the trunk lid or door that is brought down in contact with the cargo load and that is unable to latch will still swing to an open position once the vehicle is put into motion and driving occurs. Even worse, if unable to be latched the trunk lid or door will bounce or move about and repeatedly impact the cargo load as a result of the momentum induced within the trunk lid or door during driving, which momentum is created by the various inconsistencies in road conditions, such as bumps, potholes, as well as stopping and starting the vehicle.

To prevent the trunk lid or door from repeatedly impacting the cargo load, which is often delicate (e.g., furniture), the trunk lid or door must be secured, preferably tightly against the cargo load to eliminate any bounce or momentum within the trunk lid or door that could damage the cargo load. As there are presently no devices or mechanisms built into the hinge assembly or that are provided to operate with the hinged assembly that function to secure the trunk lid or door in any desired position, many have resorted to inserting a rope or strap into the trunk lid or one of its latching components and either tying or hooking the opposite end to the cargo itself, or some structure within the vehicle trunk capable of securing the rope or strap. While this seems to be the method of choice, for lack of better alternatives, there are several problems with this solution, which really isn't much of a solution. First, a suitable strap or rope must be obtained or carried in the trunk. If one is unavailable, improvising may be difficult. Second, to eliminate all momentum in the trunk lid or door the trunk lid or door must be secured against the cargo load. If not securely brought down to rest onto the cargo load, the trunk lid or door will be free to move about where it may impact and damage the cargo load. Third, the rope or strap is usually tied. When it comes time to remove the load, the rope or strap must be untied first. This can be difficult if the knot is made too tight or if driving the vehicle inadvertently causes the knots to tighten. Of course, tie downs may be used, but these comprise metal parts that also may scratch and otherwise damage the cargo load.

There are other instances where it may be desirable to located hinged components in one or more interim positions or even in a fully opened position that overcomes or counteracts one or more automatic closing devices (such as a hydraulic system). For example, it may be desirable to raise awnings to certain level. Or, it may be desirable to secure a door in an open position where a door stop is not practical or available. Indeed, many hinged assemblies exist that could benefit from a system or device capable of securing or locking the hinge in one or more positions, and particularly in one or more interim positions.

SUMMARY OF THE INVENTION

In light of the problems and deficiencies inherent in the prior art, the present invention seeks to overcome these by providing a hinge locking system configured to lock a hinged component in a desired position.

Therefore, it is an object of some of the exemplary embodiments of the present invention to provide a hinge locking system operable with the hinge of a hinged assembly or one or more of its components to support a hinged component in a desired position anywhere within its range of motion.

It is another object of some of the exemplary embodiments of the present invention to provide a hinge locking system that is easy to operate, and more particularly that is easy to actuate from an immediate or remote location.

It is still another object of some of the exemplary embodiments of the present invention to provide a hinge locking system that is durable and that is capable of withstanding and overcoming any induced forces tending to unlock the hinge and move the one or more hinged components from their locked position.

It is a further object of some of the exemplary embodiments of the present invention to provide many exemplary locking systems to accomplish the intended function of the present invention.

It is still a further object of some of the exemplary embodiments of the present invention to provide a hinge locking system that can lock the hinge or hinged component from moving one or both directions.

It is still a further object of some of the exemplary embodiments of the present invention to provide a hinge locking system that is applicable to or that may be utilized within a variety of different applications.

Although several objects of some of the various exemplary embodiments have been specifically recited herein, these should not be construed as limiting the scope of the present invention in any way. Indeed, it is contemplated that each of the various exemplary embodiments comprises other objects that are not specifically recited herein. These other objects will be apparent to and appreciated by one of ordinary skill in the art upon practicing the invention as taught and described herein.

To achieve the foregoing objects, and in accordance with the invention as embodied and broadly described herein, the present invention features a hinge locking system comprising: (a) a first component; (b) a second component relating to the first component; (c) at least one hinge system pivotally coupling the first and second components together, such that at least one of the first and second components is rotatable between a starting and ending or an open and closed position; and (d) means for locking the hinge system, wherein the means may be selectively actuated to support the first and second components in one of a plurality of desired positions relative to one another and anywhere within their range of motion.

First and second hinged components may be related to one another in various ways. For example, in one aspect first component may comprise the only movable member of the hinged assembly, wherein the movable member rotates about the hinged axis relative to the second hinged component, which comprises a stationary object. Examples of movable members are doors, lids, and other similar structures. Examples of stationary members or objects are door jambs, vehicle bodies, etc. In essence, the movable hinged member is designed to pivot about the hinge axis and come to rest within or upon the stationary hinged object.

In another aspect, first and second hinged components may each be free to move or rotate about the hinge axis.

While first and second hinged components may comprise numerous different structures, the present invention will primarily deal with various vehicle closures, such as a trunk lid or cargo area door designed to close a trunk or cargo area. One skilled in the art will recognize other applications in which the locking mechanism may be implemented.

Means for locking the hinge system may comprise various types of locking mechanisms or systems, such as a ratchet system, a clutch system, a hydraulic system, a pneumatic system, and a cable system, each one operable with the hinged assembly, and not necessarily attached or coupled to the hinge system itself.

In one exemplary embodiment, means for locking comprises a ratchet system in the form of a ratchet clutch. The ratchet clutch comprises a hub coaxially fixed to the hinge system, wherein the hub has a plurality of teeth arranged in a pattern annularly around the perimeter of the hub, with each tooth corresponding to a particular position within the hinged component's range of motion; a first pawl configured to engage the teeth upon the ratchet clutch being actuated, wherein the first pawl allows rotation of the hub and the hinge in only a first direction, thus prohibiting rotation of the hub and the hinge in a second direction; a second pawl configured to engage the teeth of the hub, wherein the second pawl allows rotation of the hub and the hinge in only the second direction, thus prohibiting rotation of the hub and the hinge in the first direction; a shifter for selectively actuating the engagement and disengagement of the first and second pawls, thus controlling the allowed rotation of the hub and the hinge; and a housing for supporting the hub, the pawls, and the shifter. This configuration provides one-way locking only of the hub and the hinge. However, the ratchet clutch may also comprise a second shifter allowing both pawls to be engaged simultaneously, thus prohibiting rotation of the hub and the hinge in any direction.

In another embodiment means for locking may comprise a roller clutch. In this embodiment, the roller clutch comprises common elements known in the art and functions to precisely locate the hinged components in any desired position, unlike the ratchet clutch described above whose positions are limited by the placement, size, and frequency of the teeth located around the hub.

In still another embodiment, means for locking may comprise a cable system. In this embodiment, the cable system may comprise a housing having an opening, wherein the housing is attached at a strategic location on one of the first and second components; a biased reel axially supported within the housing; a cable attached to and wound around the reel and extending through the opening of the housing; means for attaching the cable to an object; and a ratchet system operably coupled to the reel, wherein the ratchet system prohibits the unwinding of the cable from the reel when actuated, thus locking the hinge and the first component in a desired position with respect to the second component and anywhere within the range of motion of the first component.

In any event, the locking mechanism must be durable and able to withstand or overcome many of the forces acting upon the hinged components, either intended or inadvertent, that resultantly transfers to the locking mechanism.

The present invention further features an actuator that functions to allow a user to selectively actuate or deactivate the hinge locking mechanism. In one aspect, the actuator is a manually operated mechanical switch coupled to the locking mechanism. In another aspect, the actuator comprises a remotely operated electromechanical switch coupled to the locking mechanism. The electromechanical switch may be actuated from a remote location using a wired (e.g., a button located inside a glove box of a vehicle) or wireless (e.g., a button located on a remote control key chain or keyless entry device) connection.

The present invention further features a method for locking a hinged component in a desired position within its range of motion.

BRIEF DESCRIPTION OF THE DRAWINGS

The present invention will become more fully apparent from the following description and appended claims, taken in conjunction with the accompanying drawings. Understanding that these drawings merely depict exemplary embodiments of the present invention they are, therefore, not to be considered limiting of its scope. It will be readily appreciated that the components of the present invention, as generally described and illustrated in the figures herein, could be arranged and designed in a wide variety of different configurations. Nonetheless, the invention will be described and explained with additional specificity and detail through the use of the accompanying drawings in which:

DETAILED DESCRIPTION OF EXEMPLARY EMBODIMENTS

Figure 1:
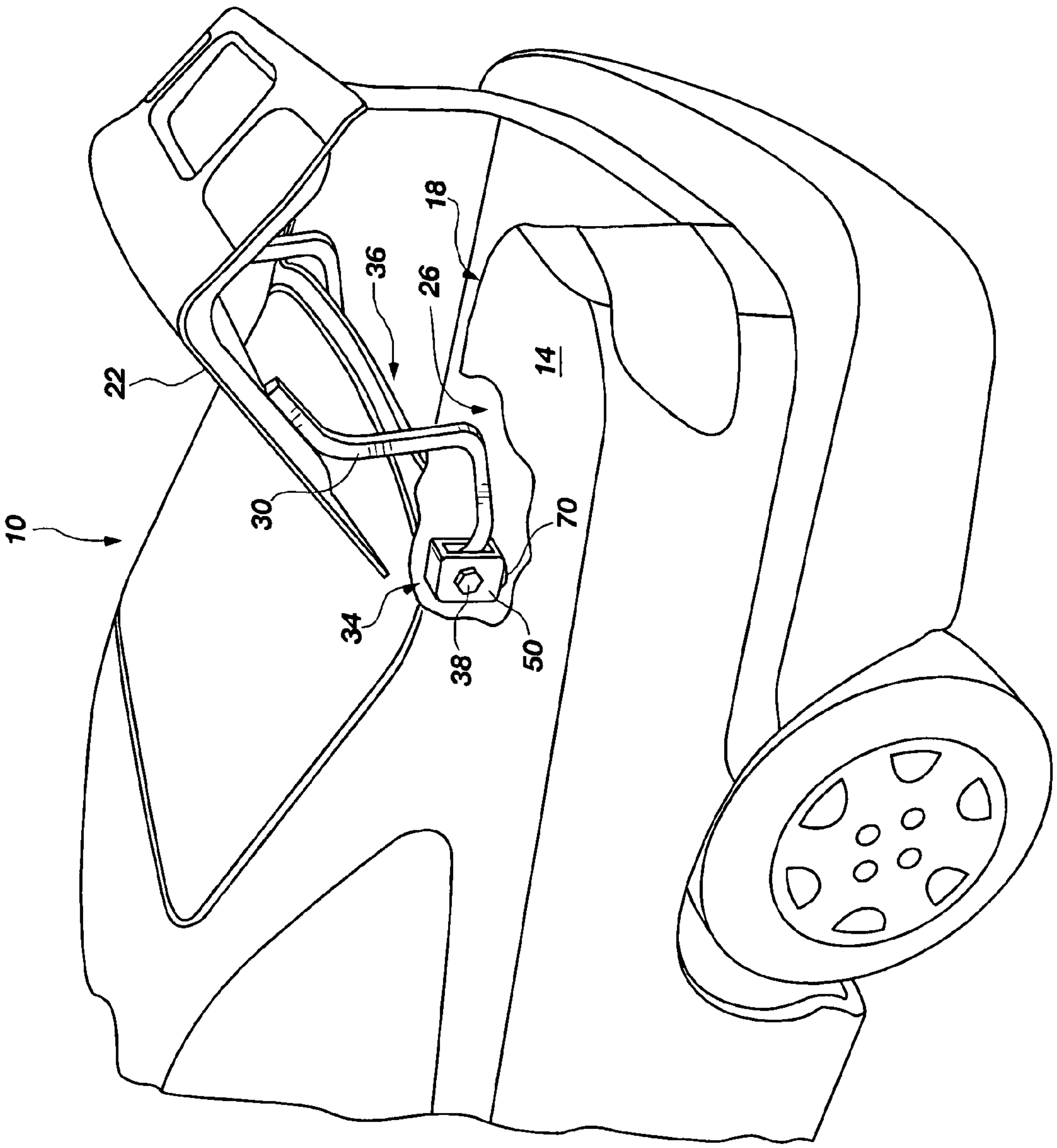
FIG. 1 illustrates a partial cut-away side view of an exemplary embodiment of a ratchet or roller-clutch type hinge locking system as applied to the trunk assembly of a vehicle.

The following detailed description of exemplary embodiments of the invention makes reference to the accompanying drawings, which form a part hereof and in which are shown, by way of illustration, exemplary embodiments in which the invention may be practiced. While these exemplary embodiments are described in sufficient detail to enable those skilled in the art practice the invention, it should be understood that other embodiments may be realized and that various changes to the invention may be made without departing from the spirit and scope of the present invention. Thus, the following more detailed description of the embodiments of the present invention, as represented in FIGS. 1 through 6, is not intended to limit the scope of the invention, as claimed, but is presented for purposes of illustration only and not limitation to describe the features and characteristics of the present invention, to set forth the best mode of operation of the invention, and to sufficiently enable one skilled in the art to practice the invention. Accordingly, the scope of the present invention is to be defined solely by the appended claims.

The following detailed description and exemplary embodiments of the invention will be best understood by reference to the accompanying drawings, wherein the elements and features of the invention are designated by numerals throughout.

The present invention describes a method and system for locking one or more hinged components in one or more desired positions with respect to one another and anywhere within their range of motion as defined and limited by the hinge system coupling the components. While those skilled in the art will recognize that the present invention may be applied to any hinged system or any hinged assembly comprising one or more components that move with respect to one another, the principal embodiment exemplified herein will consist of a hinge lock system or mechanism specifically configured or adapted for use on the trunk assembly of a vehicle. This particular application and its associated exemplary embodiments are not to be considered limiting in any way, but instead are representative of only one application to which the present invention may be applied.

It should be noted that any reference to locking the hinge or hinge system is intended to not only mean locking of the hinge or hinge system itself, but also to the locking of the hinged components coupled together by the hinge or hinge system. As such, locking the hinge system also means locking the hinged components.

Moreover, the following detailed description will set forth an exemplary embodiment of the present invention as adapted for use on a vehicle, and particularly the trunk of a vehicle. It is intended that this exemplary embodiment set forth the details of a hinge locking system in one particular exemplary application. Therefore, this embodiment should not be construed as limiting in any way, as the present invention may be applicable to various hinged assemblies coupling together various components.

With reference to FIG. 1, shown is an exemplary partial cut-away side view of hinged locking assembly 10. As illustrated, a vehicle 14 comprises a trunk jamb 18 configured for receiving a trunk 22 therein for enclosing a trunk compartment 26. Trunk 22 is rotatably coupled to vehicle 14 so that trunk 22 comes to rest within trunk jamb 18 when in a fully closed position. As is common in the industry, trunk 22 is rotatably coupled to vehicle 14 by dual complimentary trunk arms 30, only one of which is shown, which trunk arms are part of a hinge system 34. Trunk arms 30 are fixed to trunk 22 at one end and are pivotally attached at the other end to a stationary hinge component (not shown) fixed to vehicle 14. Connecting trunk arms 30 to the stationary hinge component 32 is attachment means 38. Trunk arms 30, stationary hinge component 32, and attachment means function to comprise or make up a standard hinge system 34 as commonly known in the art. Hinged assembly 36 comprises the components of hinge system 34, as well as trunk 22 and vehicle 14, and more particularly trunk jamb 18.

Attachment means 38 may be any type of object or device capable of attaching two members together in a rotatable manner to create a hinged assembly. In the embodiment shown, attachment means 38 comprises a bolt inserted through one or more bushings. Trunk arms 30 allow trunk 22 to transition between an open and closed position in an optimal manner relative to vehicle 14 and trunk jamb 18. Specifically, when opening trunk 14, trunk arms 30 position trunk 22 in an elevated position above vehicle 14 to provide additional space between vehicle 14 and trunk 22 when opened. The configuration of trunk arm 30 shown in FIG. 1 is representative of only one design.

Hinged locking assembly 10 further comprises means for locking hinged system 34 and/or hinged assembly 36. Means for locking hinged assembly 34 functions to selectively lock or support a first hinged component in one of a plurality of desired positions relative to another or second hinged component anywhere within their range of motion. This means that means for locking may lock either or both of the first or second hinged components in a fully opened position relative to one another. In addition, means for locking may lock or support either or both of the first and second hinged components in one of several interim positions relative to one another. As such, no matter the range of motion of first and second hinged components with respect to one another, means for locking may be configured to lock or support the hinged components in any open, closed, or interim positions within this range of motion. Means for locking may lock a hinged component from moving in one or both rotating directions, depending upon the particular mechanism utilized. In most embodiments herein, means for locking comprises a device, mechanism or system configured to prevent rotation of a hinged component in one direction, while allowing rotation in another direction.

In the embodiment shown in FIG. 1, the first hinged component may comprise trunk 22, while the second hinged component may comprise vehicle 14, or more particularly trunk jamb 18, wherein the two are hinged together by bolt 38. Means for locking hinged system 34 and hinge assembly 36 comprises a ratchet system, such as ratchet clutch 50, that may be selectively actuated by the user via actuator 70 to lock trunk 22 in one of many interim positions or in a fully open position. Specifically, ratchet clutch 50, when actuated or engaged, functions to allow hinge system 34 to be rotated in one direction only, namely to allow trunk 22 to be lowered from an opened or partially opened position to a pre-determined resting position while at the same time preventing the rotation of hinge system 34 in the opposite direction, and thus preventing trunk 22 from opening any further. By this configuration, trunk 22 may be brought to rest in any one of a plurality of partially opened or interim positions to be retained in that position.

Figure 2:
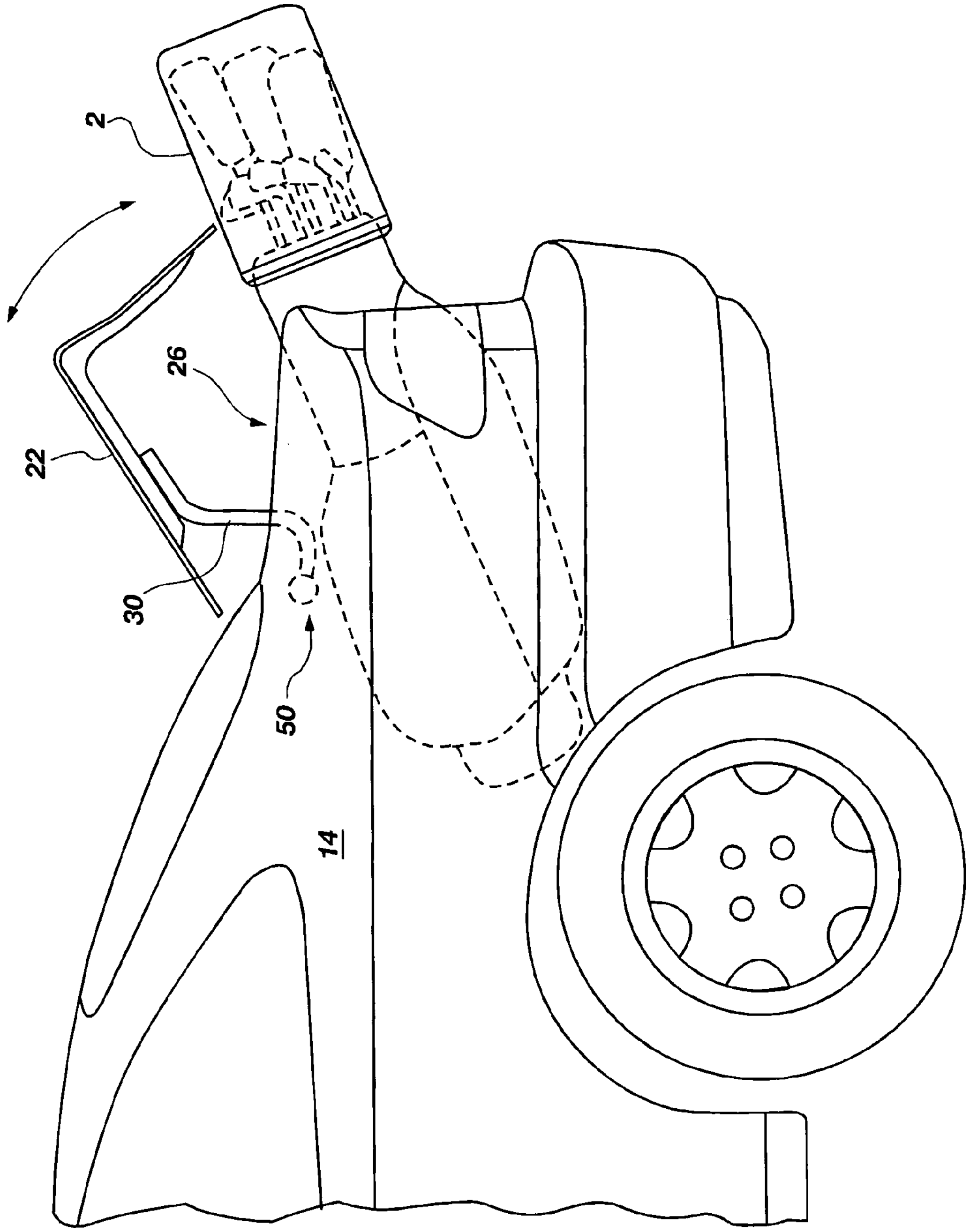
FIG. 2 illustrates a partial side view of a vehicle carrying an oversized cargo load in the trunk compartment, wherein the trunk is retained in a fixed position proximate the cargo load by an exemplary hinge locking system.

FIG. 2 illustrates this concept in relation to a cargo load 2 contained within trunk compartment 26. It is very common to carry cargo loads in the trunk of a vehicle that comprise larger dimensions than that of the trunk compartment itself. In these cases, the cargo is often inserted as far as possible within the trunk with portions of the cargo protruding there from. Utilizing the present invention, trunk 22 may be brought into a position gently resting upon cargo 2 or slightly above cargo 2 and ratchet clutch 50 actuated or engaged. Once actuated, ratchet clutch 50 will prevent any inadvertent rotation of trunk 22 in the upward direction, thus retaining trunk 22 in its position proximate cargo 2. Thus, when driving vehicle 14, trunk 22 remains in a lowered position without assistance from ropes, tie-downs, or other restraining devices. In addition, there is little bounce or movement in trunk 22 caused by bumps or other inconsistencies in the road as the accuracy of ratchet clutch 50 allows trunk 22 to be positioned in the most optimal position relative to cargo 2 to prevent or significantly reduce this. To open trunk 22, ratchet clutch 50 is deactivated or disengaged, thus allowing trunk 22 to rotate freely and operate as normal.

Figure 3:
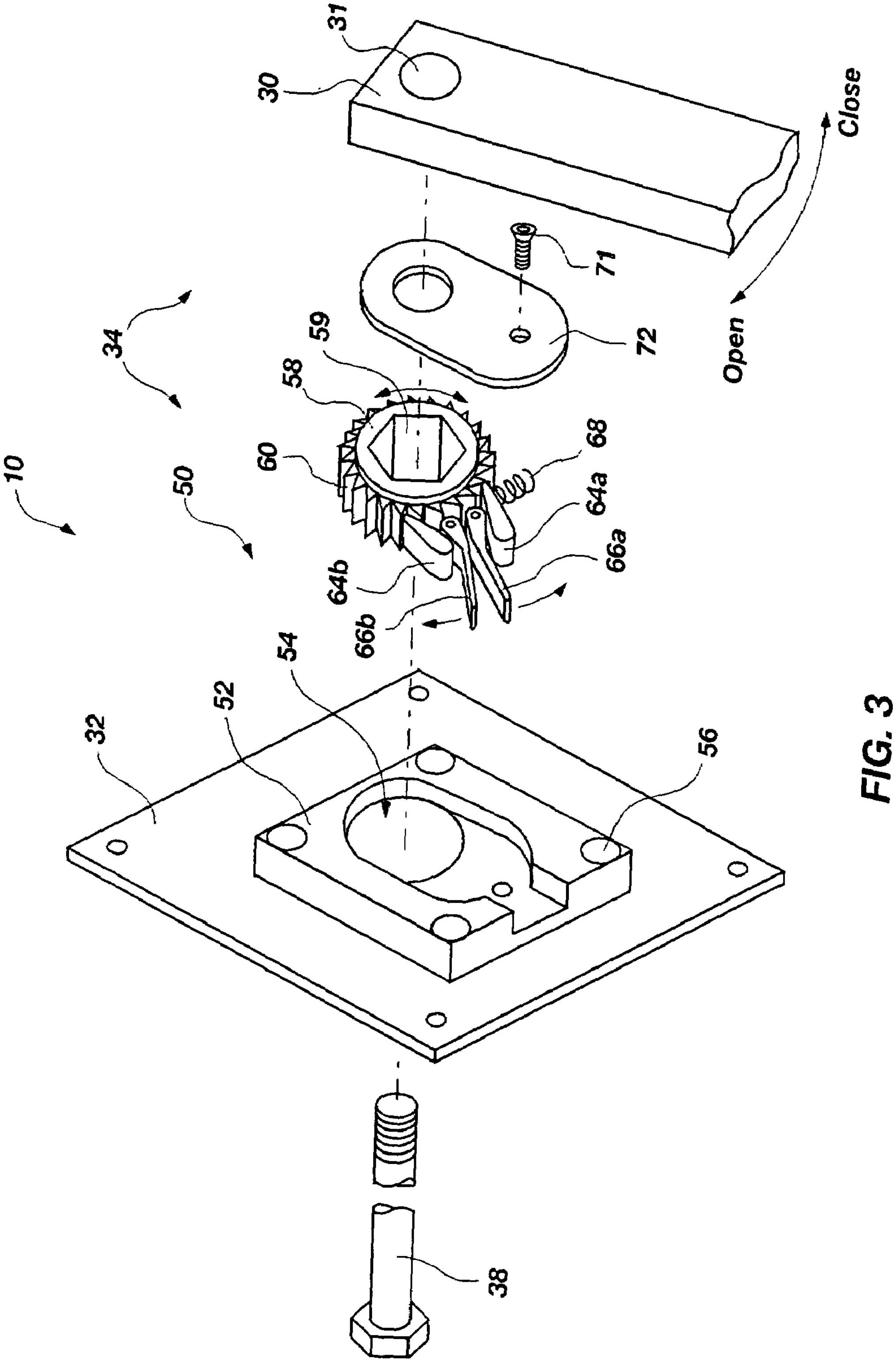
FIG. 3 illustrates a detailed view of a ratchet-type hinge locking system or assembly according to one exemplary embodiment of the present invention.

FIG. 3 illustrates a detailed exploded view of ratchet clutch 50 as operably connected to a hinge system on the trunk of a vehicle. Ratchet clutch 50 is coupled to hinge system 34 of the trunk assembly using any known means in the art allowing ratchet clutch 50 to be operable with hinge system 34. In the embodiment shown, ratchet clutch 50 comprises a housing 52 that is coupled to a stationary hinge component 32 fixed to the inside of the trunk compartment of the vehicle. In the hinge system 34, stationary hinge component 32 provides a first hinged component that is coupled to trunk arm 30, which functions as the second hinged component. These two components are coupled together by bolt 38. Ratchet clutch 50 couples to stationary hinge component 32 via attachment means 56, which typically comprise a bolt or screw.

Housing 52 further comprises an alcove 54 having a geometric configuration for receiving and supporting the various ratcheting components of ratchet clutch 50. In one aspect, ratchet clutch 50 comprises geared hub 58 having a plurality of teeth 60 that define a plurality of locking positions. Geared hub 58 also comprises a channel 59 for receiving bolt 38, wherein bolt 38 is caused to engage the geared hub, thus driving the geared hub upon rotation of trunk arm 30 and the trunk when ratchet clutch 50 is actuated. Upon actuation of ratchet clutch 50, and as geared hub 58 is caused to rotate by the trunk being brought into a pre-determined position, pawl 64-*a* engages teeth 60 so as to allow rotation in only a designated direction. However, pawl 64-*a* is configured so that, when engaged, it is unable to apply a counter force to teeth 60 of geared hub 58, thus allowing geared hub 58 to rotate in one direction without interference from pawl. Stated differently, pawl 64-*a* is configured to allow geared hub 58 to rotate in one direction without having the ability to prevent this, even though engaged. This is due to the positioning of pawl 64-*a* relative to geared hub 58 and its geometric configuration. Pawl 64-*a* is securely and pivotally supported within housing 52 and is also biased, such as via a spring 68, so to be able to engage teeth 60 when ratchet clutch 50 is actuated. Pawl 64-*a* and geared hub 58 function together to define and control the intermittent motion and positioning in a designated direction of rotation.

With ratchet clutch engaged, only one direction of rotation is made possible. When rotation in the opposite direction is tried, pawl 64-*a* functions to apply an opposing force against one of the plurality of teeth 60, thereby preventing further rotation of geared hub 58 in that direction. As illustrated in FIG. 3, pawl 64-*a* is positioned and biased such that trunk arm 30 may freely rotate in a direction effectively closing the trunk of the vehicle. However, any intentional or inadvertent rotation in the opposite direction that would effectively open the trunk is prevented as pawl 64-*a* applies a countering force to one of teeth 60 of geared hub 58, thus prohibiting rotation in that direction.

Pawl 64-*a* is actuated by one or more shifters, shown as shifters 66-*a* and 66-*b*. Shifters 66-*a* and 66-*b* comprise a cam that functions to cause pawl 64-*a* or pawl 64-*b*, respectively, to engage and disengage teeth 60 upon pivoting either shifter about its axis. Shifters 66-*a* and 66-*b* are also configured to extend a partial distance out of housing 52 so that manual or electromechanical means may be used to actuate them.

Ratchet clutch 50 may comprise multiple pawls (shown as pawls 64-*a* and 64-*b*) actuated by corresponding multiple shifters (shown as shifters 66-*a* and 66-*b*). In this configuration, a first pawl would prevent rotation in one direction and a second pawl would prevent rotation in an opposite direction. In addition, first and second shifters would correspondingly control first and second pawls. In operation, when hinged locking system is engaged, first and second pawls would simultaneously engage teeth 60 of geared hub 58, thus preventing rotation in any direction. Likewise, upon deactivation, first and second pawls would simultaneously disengage teeth 60, allowing hinge system 34 to freely rotate. Multiple shifters and pawls allow ratchet clutch 50 to effectuate two-way locking of hinge system 34.

Optionally, ratchet clutch 50 comprises a cover plate 72 to help contain each of the component parts of ratchet clutch 50 within housing 52. Cover plate 72 attaches to housing via attachment means, shown as screw 71.

Although shown in exploded view, these components fit within housing 52 to comprise ratchet clutch 50. Ratchet clutch 50 is coupled to stationary hinge component 32 and then operably coupled with trunk arm 30 to provide means for locking hinge system 34, which pivotally connects trunk arm 30 (and the trunk) to the vehicle. In this configuration, a hinge locking system is created that allows the user to lower the trunk to any designated position and prevent its upward movement when ratchet clutch 50 is engaged.

It should be noted that components of ratchet clutch 50 may also be contained within trunk arm 30 rather than coupled to stationary hinge component 32. In this embodiment, trunk arm 30 operably supports geared hub 58, pawl 64-*a*, and shifter 66-*a* within its structure, wherein rotation of trunk arm 30 subsequently causes rotation of geared hub 58. Actuation of the ratchet system would be similar to that described above.

Figure 4:
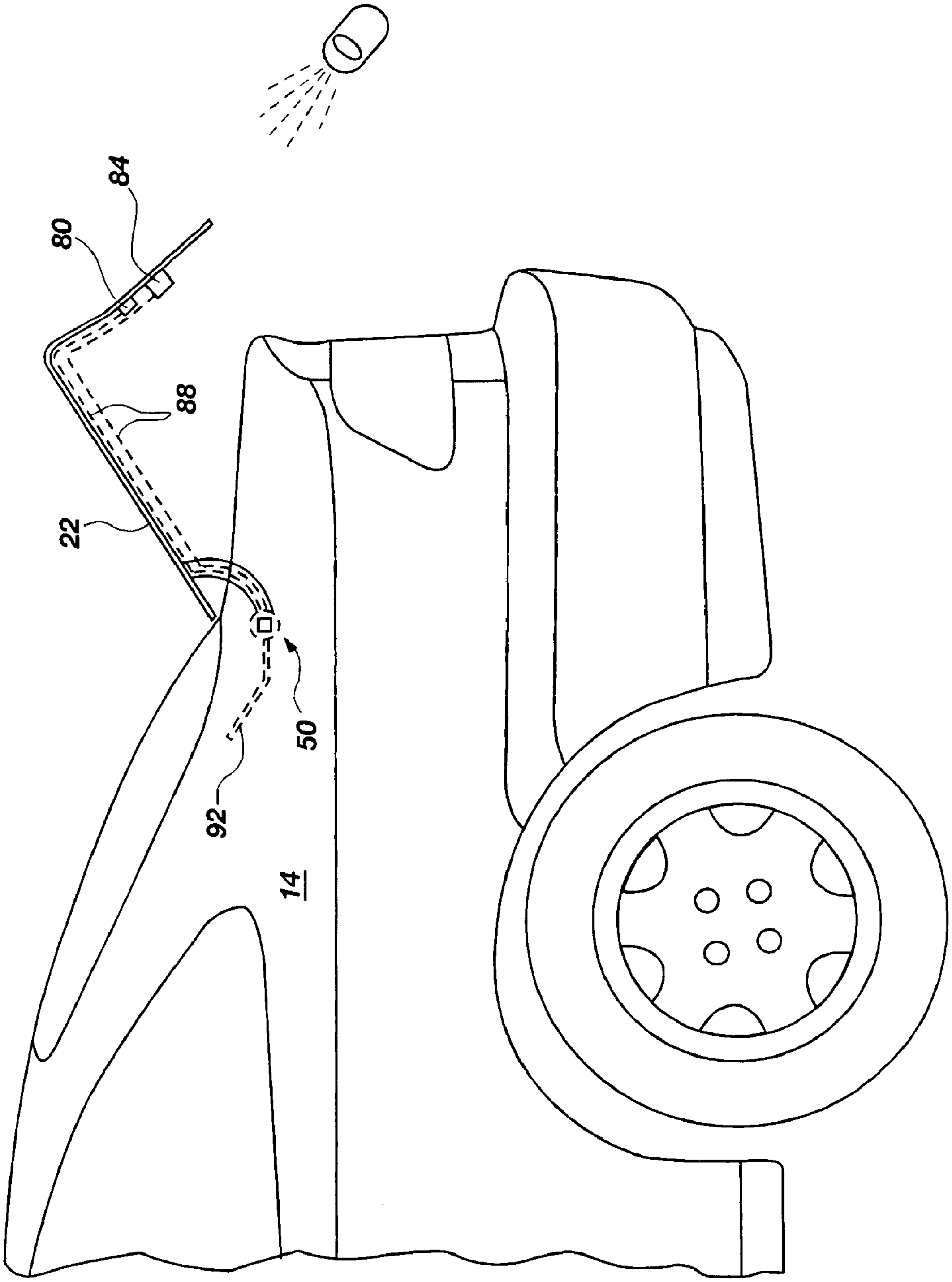
FIG. 4 illustrates a partial side view of a vehicle comprising a hinge locking system that is operated by one or more strategically positioned switches.

FIG. 4 illustrates means for actuating the various hinge locking systems or devices described herein. Means for actuating may comprise any mechanical, electrical, or electromechanical system or device commonly known in the art for carrying out the function of actuating and deactivating ratchet clutch 50. In the embodiment shown, means for actuating comprises one or more electrical switches, shown as actuating switch 80 and deactivating switch 84. These switches may be electrically coupled to actuator 70 or shifter 66-*a*. With reference to FIGS. 3 and 4, upon depressing actuating switch 80, shifter 66-*a* is caused to rotate, thus engaging pawl 64-*a* into teeth 60 and preventing rotation of geared hub 58 against pawl 64-*a*. Upon depressing deactivating switch 84, shifter 66-*a* is caused to rotate in an opposite direction, thus also disengaging pawl 64-*a* from teeth 60. Switches 80 and 84 are preferably placed in an easy to reach location either on the inside of the trunk itself, within the trunk, or within the interior passenger compartment of the vehicle. As shown, switches 80 and 84 are located on the underside of the trunk and closest to the opening. Switches 80 and 84 may be connected with ratchet clutch 50 via wired or wireless means. In the embodiment shown, switches 80 and 84 are connected to ratchet clutch via wires 88. However, it is contemplated that ratchet clutch 50 may be equipped with one or more sensors for receiving one or more wireless signals from a transmitter, such as that contained in a keyless entry device. In this embodiment, ratchet clutch 50 is remotely controlled.

FIG. 4 also illustrates and the present invention further comprises an emergency release 92 operably connected with ratchet clutch 50. Emergency release 92 operates to disengage ratchet clutch 50 in the event its normal means for actuating and deactivating fails. Emergency release 92 may comprise an override switch or lever that disengages ratchet clutch 50 if necessary.

Ratchet clutch 50 and its components are commonly known in the art. However, the present invention hinge locking system for locking hinged assembly 34, namely ratchet clutch 50, as applied to the trunk assembly of a vehicle is not known. To the inventors knowledge, there are presently no vehicles that comprise a system or device for locking a trunk in an open or partially open position. There are systems and devices, such as hydraulic or pneumatic devices, that assist in the opening of a trunk, as well that function to retain the trunk in an opened position. However, these systems or devices do not lock the trunk in any one position to prevent its movement in one or more directions. A partially opened trunk is able to move in either direction without limitation other than those limitations inherent in the hinged assembly itself. An opened trunk is still able to be lowered as a result of advertent or inadvertent force. There is nothing to support or lock the trunk in any one position. As such, it is one goal of the present invention to cover any device, mechanism, or system configured to retain one hinged component in a pre-determined position with respect to another hinged component. In the case of the exemplary embodiment shown, it is a goal of providing means for locking trunk 22 in an opened or partially opened position relative to vehicle 14, wherein the means for locking comprises any device, mechanism, or system.

It should be noted that a hinge lock system may also be applied to a cargo door of a van, sport-utility vehicle (SUV), or any other similar vehicle that comprises a vertical swinging door. In these embodiments, the hinged assembly may comprise a different configuration than that for a trunk, but may be made to comprise one or more types of hinge lock systems. Indeed, any door, hood, or trunk of a vehicle may comprise a hinge locking system as described herein.

In another exemplary embodiment, means for locking a hinged assembly may comprise a different type of clutch system, such as a bi-directional roller clutch. In this embodiment, the bi-directional roller clutch functions in a similar manner to prior art roller clutches, but rotates in two directions and is capable of prohibiting the rotation of an object in any direction. Bi-directional roller clutches are well known in the art and are not specifically discussed herein.

In another exemplary embodiment, means for locking a hinged assembly may comprise a locking hydraulic or pneumatic system. In this embodiment, either the hydraulic or pneumatic arm may comprise a locking system, or a separate and independent locking system may be operably related to the hydraulic or pneumatic arm. In either configuration, actuation of the locking system would lock the hydraulic or pneumatic device, thus effectively locking the hinge system and hinged components in one or more positions.

Figure 5:
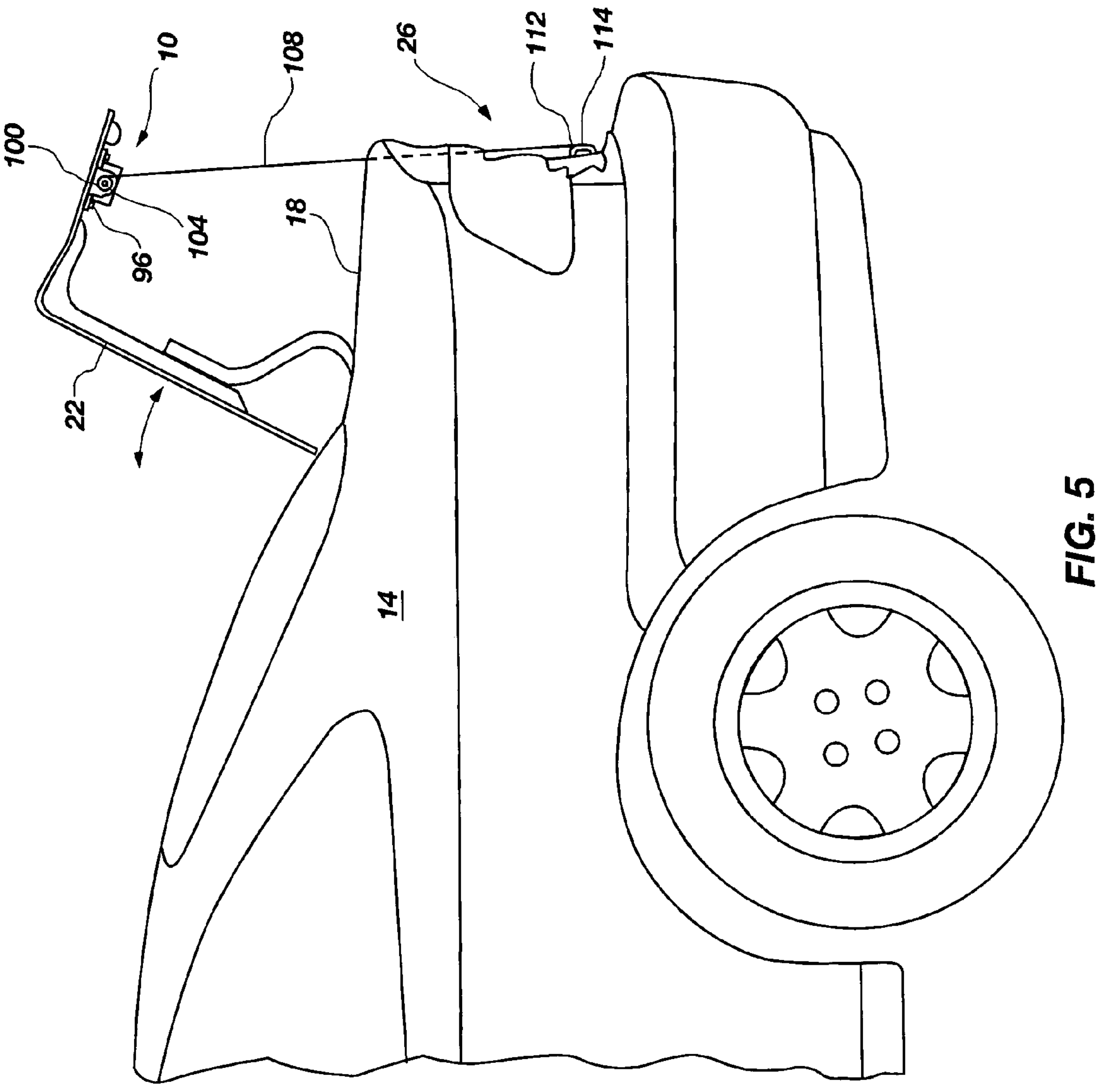
FIG. 5 illustrates another exemplary embodiment for a vehicle trunk hinge locking system comprising a retractable cable system.

FIG. 5 illustrates another exemplary embodiment of hinge locking system 10 comprising a cable and pulley system. As shown, hinge locking system 10 comprises a cable mount 96 in the form of a housing that supports therein one or more pulleys 100. In one aspect, pulley 100 may comprise a biasing element configured to automatically retract a wound cable 108, and to prevent unwinding when actuated. In another aspect, pulley 100 may comprise a ratcheting system, such as the ratchet clutch, described above. These hinge locking mechanisms or systems are used to prevent cable 108 from unwinding once engaged. Pulley 100 is rotatably coupled within cable mount 96 using any known attachment means capable of allowing pulley 100 to rotate about point 104.

Wound around pulley 100 is cable 108. Cable 108 may be pulled or unwound from pulley 100 at different lengths to accommodate different desired positions of trunk 22 with respect to vehicle 14 and trunk jamb 18. Cable 108 has attached at its end a hook 112 or other similar attaching device capable of securely engaging a latch 114 fixed to the inside of trunk compartment 26 of vehicle 14.

Cable mount 96 may be mounted anywhere on the inside surface of trunk 22. The embodiment shown illustrates cable mount 96 mounted at a distal end of trunk 22 referenced from its hinge system. In this position, cable 108 having hook 112 thereon may be pulled down to attach to existing trunk latch 114. However, cable mount 96 may also be mounted in a location more proximate the hinge system. In this case, hinge locking system 10 would further comprise a similar latch mounted within trunk compartment 26, preferably on a sidewall, configured and positioned to receive hook 112.

In a retracted position, cable 108 and hook 112 are contained within cable mount 96. In operation, cable 108 is pulled from cable mount 96 a pre-determined length depending upon the desired locking position for trunk 22. With the locking mechanism engaged, cable 108 is unable to further unwind from pulley 100. Trunk 22 is brought down into its desired position and hook 112 attached to latch 114. Once hook 112 is latched, cable 108 locks trunk 22 in place and prevents it from opening. To return the system to normal, the hinge locking mechanism or system operably connected to pulley 100 is disengaged or deactivated, thus allowing allow cable 108 to retract into cable mount 96. Once again, trunk 22 is free to operate as normal.

Figure 6:
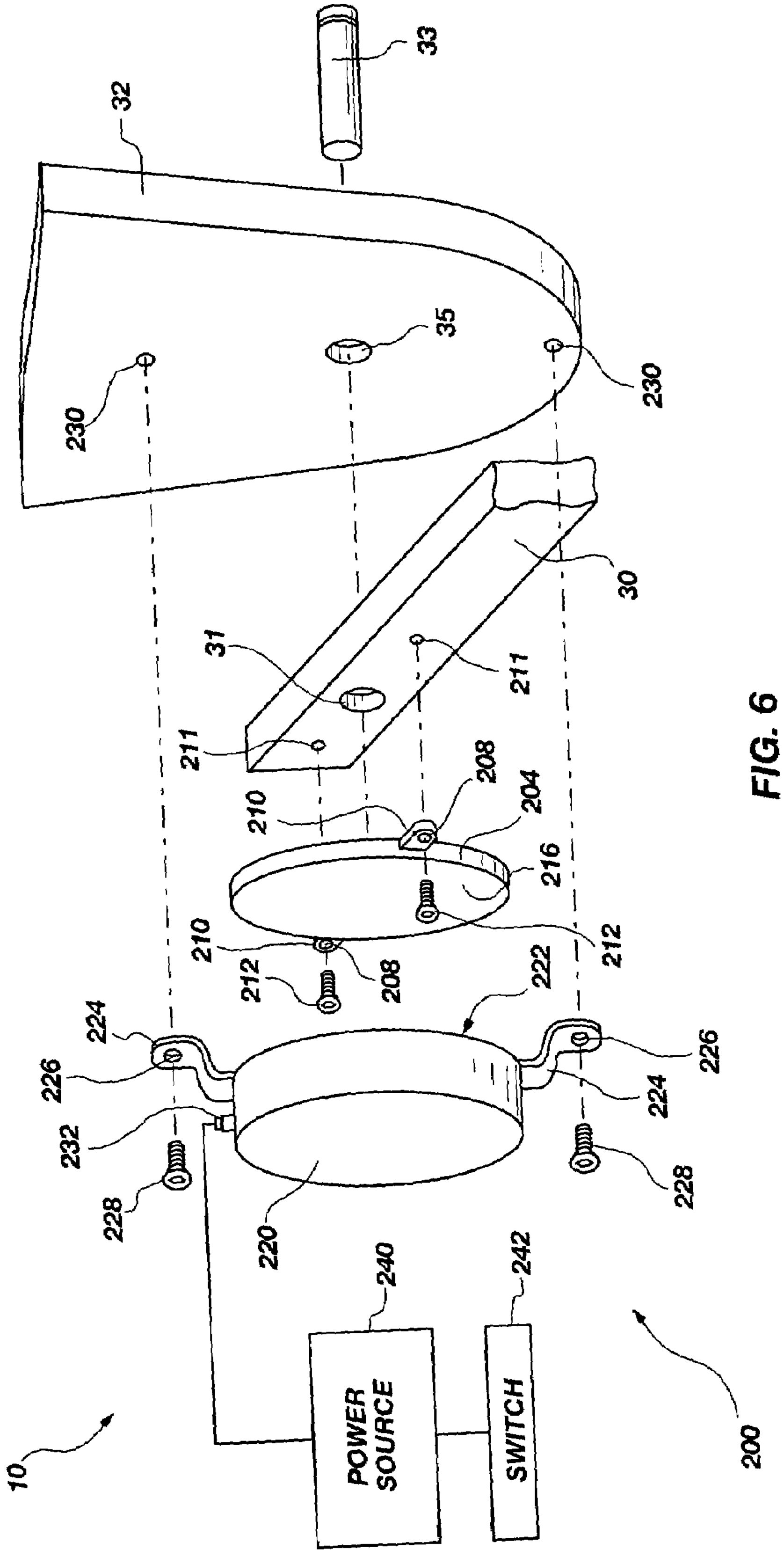
FIG. 6 illustrates still another exemplary embodiment of a vehicle trunk hinge locking system comprising an electromagnetic clutch system.

With reference to FIG. 6, shown is another exemplary embodiment of a hinged locking assembly 10 in the form of an electromagnetic system 200. Electromagnetic system 200 comprises a steel plate 204 that attaches to trunk arm 30. Trunk arm 30 is similar to those discussed above and pivotally couples to stationary hinge component 32 of a vehicle (not shown) using hinged axle 33 as inserted through aperture 35 of stationary hinge component 32 and aperture 31 of trunk arm 30. Steel plate 204 comprises a circular configuration having first and second brackets 208 extending therefrom, wherein first and second brackets 208 have apertures 210 therein that align with apertures 211 in trunk arm 30. Steel plate 204 is bolted onto trunk arm 30 using any known fastening or attachment means known in the art, such as bolt connections 212 that are inserted through apertures 210 of brackets 208 and subsequently into apertures 211 of trunk arm 30. This assembly configuration functions to keep steel plate 204 from pivoting or rotating about trunk arm 30. Steel plate 204 may comprise any type of material configured to or capable of attracting a magnet.

Electromagnetic hinge locking system 200 further comprises an electromagnet 220 that couples to stationary hinge component 32 using any known attachment means capable of securely coupling electromagnet 220 so that it is prohibited from rotating about stationary hinge component 32. In the embodiment shown, electromagnet 220 comprises attachment brackets 224 extending therefrom, wherein attachment brackets 224 comprise apertures 226 that align with apertures 230 on stationary hinge component 32. Bolts 228 are inserted through apertures 226 and subsequently into or through apertures 230, thus securing electromagnet 220 to stationary hinge component 32. Electromagnet 220 is comprised of an electrically conducting material, such as metal. Electromagnetic 220 may comprise several different configurations as are commonly known in the art.

Electromagnet 220 is attached to stationary hinge component 32 so that it is directly over and adjacent steel plate 204. Specifically, electromagnet 220 comprises a surface 222 that is aligned with a surface 216 of steel plate 204. These two surfaces may be of a similar geometric dimension so that they are complimentary to one another, or they may comprise different dimensions. In any event, steel plate 204 is attached to pivoting trunk arm 30 (or any other pivoting hinged component) such that its axial center is equivalent to the center of rotation or pivoting point of trunk arm 30 about stationary hinge component 32. Likewise, electromagnet is attached to stationary hinge component 32 such that its axial center is also aligned with the center of rotation of trunk arm 30 about stationary hinge component 32. As such, steel plate 204 and electromagnet 220 are coaxial. Upon opening and closing the trunk or other hinged component, steel plate 204 coaxially rotates about electromagnet 220, which is fixed in a stationary position to stationary hinge component 32.

Electromagnetic hinge locking system 200 further comprises a power source 240 located somewhere within the vehicle for supplying an electrical current to electromagnet 220 through electrical input 232 electrically connected to electromagnet 220. The power source 240 may be a stand-alone power source, or an existing power source of the vehicle, such as the battery/alternator system. In the embodiment, shown, electromagnet 220 comprises a 12 V system. To actuate electromagnetic hinge locking system 200, a switch 242 is activated that functions to control power source 240 to supply current to electromagnet 220, wherein electromagnet 220 suddenly goes from a non-magnetized state to a magnetized state as is commonly known in the art. In its non-magnetized state, steel plate 204 is allowed to freely rotate about electromagnet 220. However, once a current is supplied to electromagnet 220, it is instantly magnetized. As magnetized, electromagnet 220 attracts surface 216 of steel plate 204 to its matching or complementary surface 222. These two surfaces are temporarily coupled or locked together, thus preventing the rotation of steel plate 204 and trunk arm 30 about electromagnet 220. This action effectively locks trunk arm 30 in place, and subsequently the trunk attached or couple to trunk arm 30. To deactivate the system, the switch 242 is turned off, thus removing current from electromagnet 220. Once deactivated, steel plate 204 is again free to rotate about electromagnet 220, as is trunk arm 30 (and the attached trunk) about stationary hinge component 32. Unlike the ratcheting system described above, the electromagnetic hinge locking system 200 is a much more precision controlled system, wherein the electromagnet 220 may be actuated to prevent the rotation of steel plate 204 about electromagnet 220 in any position. As such, the trunk of a vehicle may be precisely locked in any position between an open and closed position.

The present invention further features a method for locking a hinged component in a desired position within its range of motion. The method comprises (a) obtaining a hinged assembly comprising first and second hinged components coupled together by one or more hinge systems having a hinged axis, wherein the hinge system is configured to locate the first and second components in a plurality of positions relative to one another; (b) providing a hinge lock mechanism operable with the hinged assembly, wherein the hinge lock mechanism is selectively actuated; (c) locating one or both of the first and second components in a desired position relative to one another and anywhere within their range of motion; (d) actuating the hinge lock mechanism, wherein the hinge lock mechanism functions to support one or both of the first and second components in the desired position and prevent unwanted rotation of either of the first and second components. The hinge lock mechanism may be configured to provide one-way or two-way locking of the hinge system.

The method further comprises the step of deactivating the hinge lock mechanism, thus allowing the first and second components to freely rotate about the hinged axis. In addition, the method further comprises relocating at least one of the first and second components to a second desired position and actuating the hinge lock mechanism to support either one of the first and second components in the second desired position. This step may be repeated as often as necessary to obtain any number of desired locations.

The hinge lock mechanism is particularly configured to provide one-way locking of the hinged assembly. However, two-way locking is also contemplated, as discussed above. In a two-way locking system, rotation of the hinged components in any direction is prohibited.

The foregoing detailed description describes the invention with reference to specific exemplary embodiments. However, it will be appreciated that various modifications and changes can be made without departing from the scope of the present invention as set forth in the appended claims. The detailed description and accompanying drawings are to be regarded as merely illustrative, rather than as restrictive, and all such modifications or changes, if any, are intended to fall within the scope of the present invention as described and set forth herein.

More specifically, while illustrative exemplary embodiments of the invention have been described herein, the present invention is not limited to these embodiments, but includes any and all embodiments having modifications, omissions, combinations (e.g., of aspects across various embodiments), adaptations and/or alterations as would be appreciated by those in the art based on the foregoing detailed description. The limitations in the claims are to be interpreted broadly based the language employed in the claims and not limited to examples described in the foregoing detailed description or during the prosecution of the application, which examples are to be construed as non-exclusive. For example, in the present disclosure, the term “preferably” is non-exclusive where it is intended to mean “preferably, but not limited to.” Any steps recited in any method or process claims may be executed in any order and are not limited to the order presented in the claims. Means-plus-function or step-plus-function limitations will only be employed where for a specific claim limitation all of the following conditions are present in that limitation: a) “means for” or “step for” is expressly recited; b) a corresponding function is expressly recited; and c) structure, material or acts that support that structure are not recited. Accordingly, the scope of the invention should be determined solely by the appended claims and their legal equivalents, rather than by the descriptions and examples given above.

What is claimed and desired to be secured by Letters Patent is:

1. A hinge locking system comprising:
- a first hinged component;
- a second hinged component relating to said first hinged component;
- a hinge system, independent of said first and second hinged components, said hinge system being configured to pivotally couple said first and second hinged components together, such that at least one of said first and second hinged components is rotatable relative to the other within a range between 0 and 360°; and
- means for locking said hinge system, said means for locking configured to be selectively actuated anywhere within said range to positively lock said first and second hinged components in a desired position relative to one another, said means for locking also being configured to be selectively actuated anywhere within said range to positively unlock said first and second hinged components to permit free rotation thereof.

2. The hinge locking system of claim 1, wherein said means for locking comprises a ratchet system.

3. The hinge locking system of claim 2, wherein said ratchet system is a ratchet clutch comprising:
- a hub coaxially fixed to said hinge and having a plurality of teeth, each corresponding to an interim position;
- a first pawl configured to engage said teeth when actuated to allow rotation of said hub and said hinge in only a first direction, thus prohibiting rotation of said hub and said hinge in a second direction;
- a second pawl configured to engage said teeth when actuated to allow rotation of said hub and said hinge in only said second direction, thus prohibiting rotation of said hub and said hinge in said first direction;
- a shifter for selectively actuating the engagement and disengagement of said first and second pawls, thus controlling the allowed rotation of said hub and said hinge; and
- a housing for supporting said hub, said pawls, and said shifter.

4. The hinge locking system of claim 3, wherein said ratchet clutch further comprises:
- a second shifter for selectively actuating the engagement and disengagement of said second pawl, said first shifter selectively actuating the engagement and disengagement of said first pawl, said first and second pawls configured to simultaneously engage said teeth, thus locking said hub and said hinge and preventing their rotation in any direction, said first and second pawls also configured to be simultaneously disengaged from said hub, thus allowing said hub and said hinge to rotate in any direction.

5. The hinge locking system of claim 2, wherein said clutch system comprises a roller clutch operably connected to said hinge for precise interim positioning of said first and second components relative to one another.

6. The hinge locking system of claim 2, wherein said clutch system comprises an electromagnetic clutch operably connected to said hinge for precise interim positioning of said first and second components relative to one another.

7. The hinge locking system of claim 2, wherein said cable system comprises a cable ratchet system comprising:
- a housing having an opening, said housing attached at a strategic location on one of said first and second components;
- a biased reel axially supported within said housing;
- a cable attached to and wound around said reel and extending through said opening of said housing;
- means for attaching said cable to an object; and
- a ratchet system operably coupled to said reel, said ratchet system prohibiting the unwinding of said cable from said reel when actuated, thus locking said hinge and said first component in an interim position with respect to said second component.

8. The hinge locking system of claim 1, further comprising an actuator for selectively actuating said means for locking, thus selectively engaging and disengaging a locking system of said means for locking.

9. The hinge locking system of claim 8, wherein said actuator comprises a manually operated mechanical switch coupled to said means.

10. The hinge locking system of claim 8, wherein said actuator comprises a remotely operated electromechanical switch coupled to said means.

11. The hinge locking system of claim 1, wherein said means for locking is configured to withstand a force acting to displace at least one of said components from an interim position.

12. The hinge locking system of claim 1, further comprising a limit switch that functions to disengage said means when its locking system has traveled through its entire range of motion.

13. The hinge locking system of claim 1, wherein said first component comprises a vehicle trunk and said second component comprises a trunk jamb.

14. The hinge locking system of claim 1, wherein said first component comprises a vehicle trunk and said second component comprises a trunk jamb.

15. The hinge locking system of claim 1, wherein said means effectuates one-way locking of said hinged components.

16. The hinge locking system of claim 1, wherein said means effectuates two-way locking of said hinged components.

17. A vehicle hinged closure locking system comprising:
- a closure on a vehicle configured to selectively transition between an open and shut position;
- a receiver configured to receive said vehicle closure when shut;
- at least one hinge assembly pivotally coupling said closure to said receiver;

a clutch locking system operably coupled to said hinge assembly, said clutch locking system configured to be selectively actuated anywhere within a range of motion to positively lock and support said closure in one of a plurality of desired positions relative to said receiver, said locking system also configured to be selectively actuated anywhere within said range of motion to unlock and to permit free rotation of said closure.

18. The vehicle hinged closure locking system of claim 17, wherein said clutch locking system comprises a ratchet system.

19. The vehicle hinged closure locking system of claim 18, wherein said ratchet system comprises:

a hub coaxially fixed to said hinge and having a plurality of teeth, each corresponding to an interim position;

a first pawl configured to engage said teeth when actuated to allow rotation of said hub and said hinge in only a first direction, thus prohibiting rotation of said hub and said hinge in a second direction;

a second pawl configured to engage said teeth when actuated to allow rotation of said hub and said hinge in only said second direction, thus prohibiting rotation of said hub and said hinge in said first direction;

a shifter for selectively actuating the engagement and disengagement of said first and second pawls, thus controlling the allowed rotation of said hub and said hinge; and a housing for supporting said hub, said pawls, and said shifter.

20. The vehicle hinged closure locking system of claim 19, wherein said shifter is mechanical and manually operated.

21. The vehicle hinged closure locking system of claim 19, wherein said shifter is electromechanical and remotely operated.

22. A method for locking a hinged component in a desired position within its range of motion comprising:

obtaining a hinged assembly comprising first and second components coupled together by one or more hinge systems having a hinged axis, said hinge system configured to locate said first and second components in a plurality of positions relative to one another;

providing a hinge lock mechanism operable with said hinged assembly, said hinge lock mechanism being configured to be selectively actuated to positively lock and unlock said first and second components anywhere within a range of motion of said hinged assembly;

locating at least one of said first and second components in a desired position relative to the other and anywhere within their range of motion;

actuating said hinge lock mechanism, said hinge lock mechanism functioning to support said first and second components in said desired position.

23. The method of claim 22, further comprising the step of deactivating said hinge lock mechanism, thus allowing said first and second components to freely rotate about said hinged axis.

24. The method of claim 22, further comprising relocating at least one of said first and second components to a second desired position and actuating said hinge lock mechanism to support said first and second components in said second desired position.

25. The method of claim 22, wherein said hinge lock mechanism is configured to provide one-way locking of said hinged assembly.

26. The method of claim 22, wherein said hinge lock mechanism is configured to provide two-way locking of said hinged assembly, thus completely locking said hinged assembly in said desired position.

27. The method of claim 22, wherein said hinge lock mechanism comprises a ratchet clutch.

* * * * *